Nov. 24, 1964            R. T. MARETTE ETAL            3,158,239
                           THROTTLE CONTROL
Filed June 2, 1960                                    4 Sheets-Sheet 2
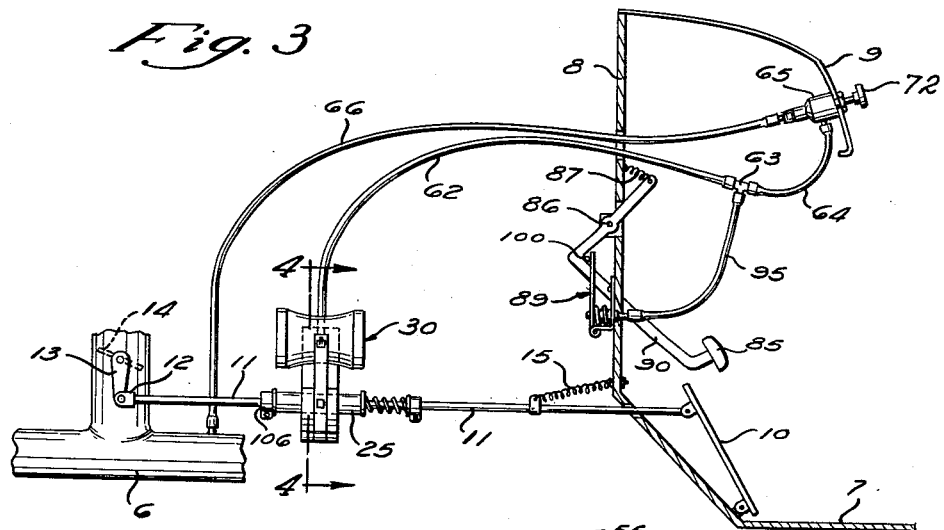
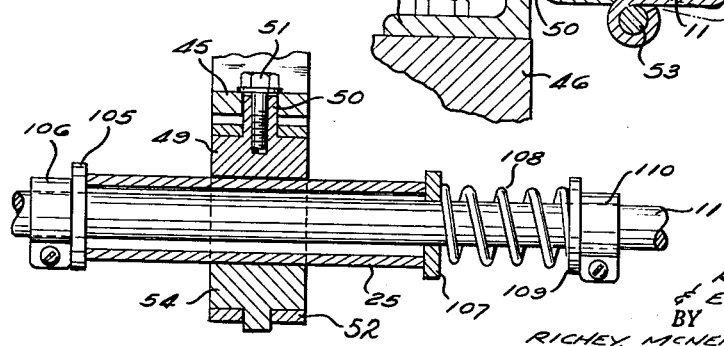
INVENTORS
RALPH T. MARETTE,
& ELLIS M. WELLMAN
BY
RICHEY, MCNENNY & FARRINGTON
Donald W. Farrington
ATTORNEYS Nov. 24, 1964 R. T. MARETTE ETAL 3,158,239
THROTTLE CONTROL
Filed June 2, 1960 4 Sheets-Sheet 3
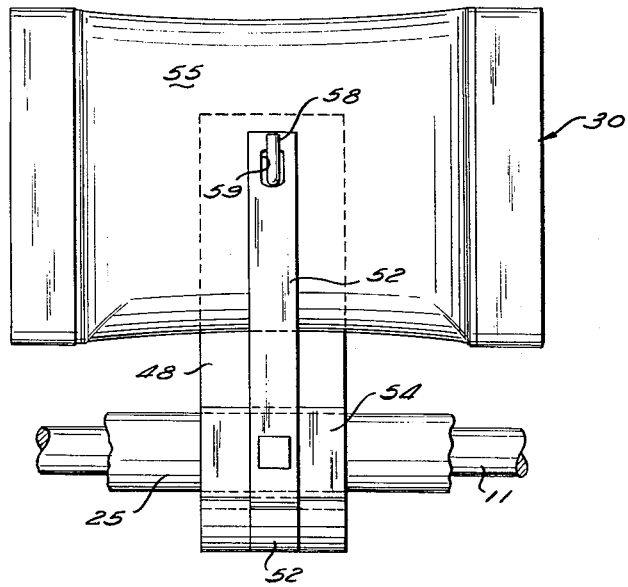
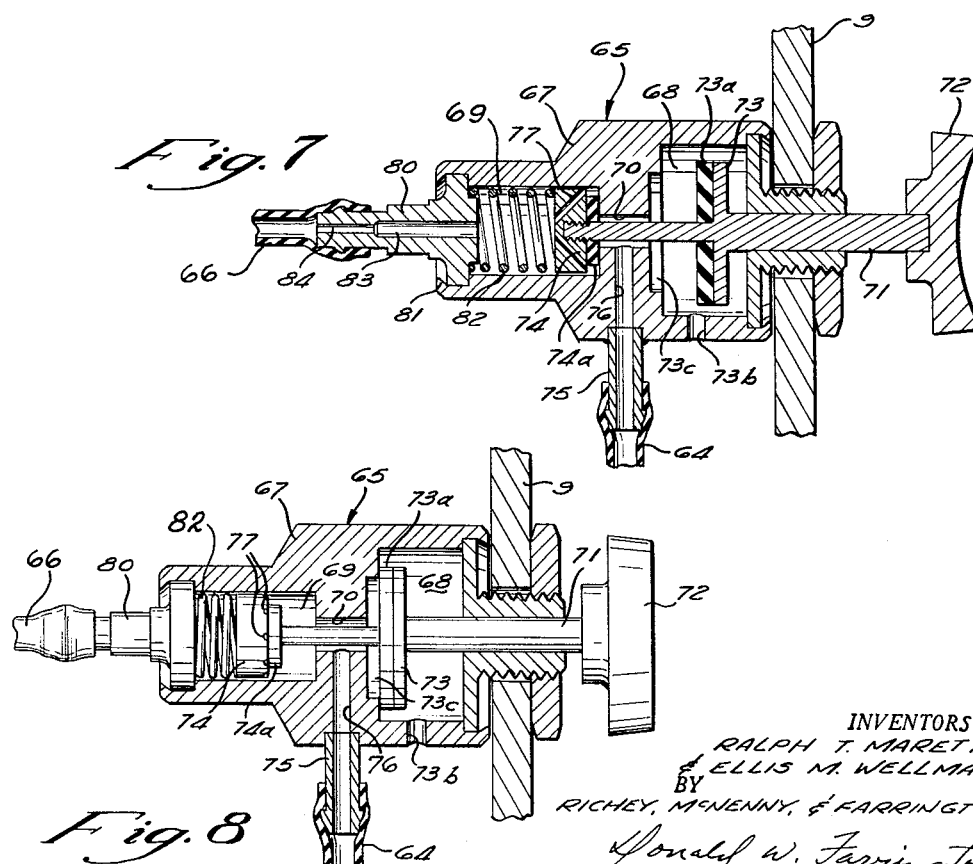
INVENTORS
RALPH T. MARETTE,
& ELLIS M. WELLMAN
BY
RICHEY, McNENNY, & FARRINGTON
Donald W. Farrington
ATTORNEYS INVENTORS
RALPH T. MARETTE,
& ELLIS M. WELLMAN
BY
RICHEY, McNENNY & FARRINGTON
Donald W. Farrington
ATTORNEYS

United States Patent Office 3,158,239
Patented Nov. 24, 1964

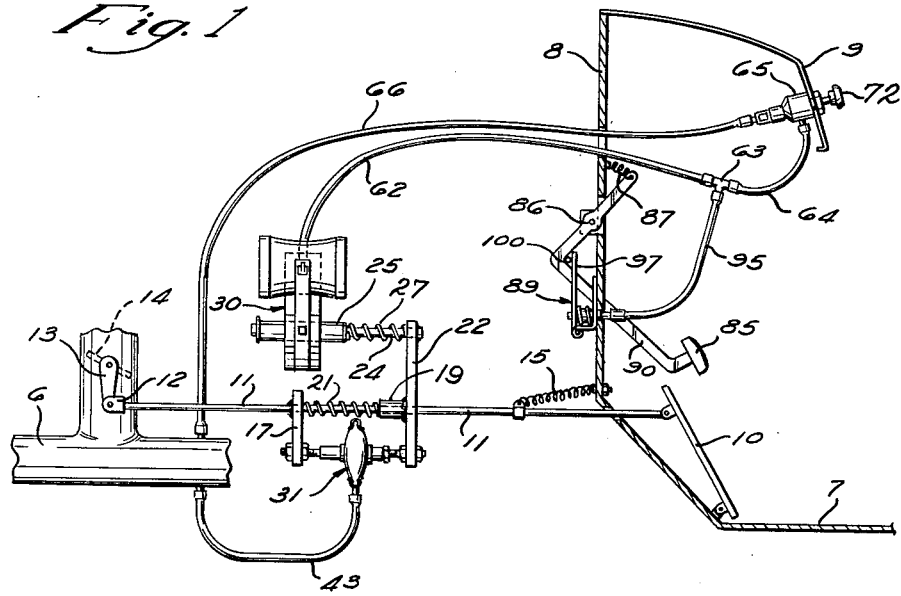
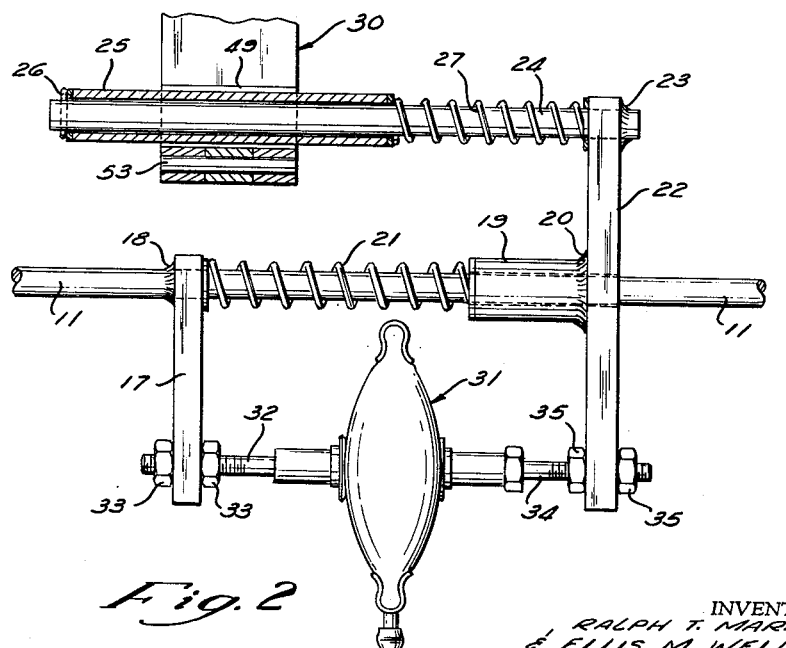

3,158,239
THROTTLE CONTROL
Ralph T. Marette, Cleveland Heights, Ohio, and Ellis M. Wellman, Erie, Pa., assignors to The Weatherhead Company, Cleveland, Ohio, a corporation of Ohio
Filed June 2, 1960, Ser. No. 33,506
16 Claims. (Cl. 192—3)

This invention relates to a throttle control for motor vehicles and more particularly to a throttle control of the type which will maintain a predetermined speed of the vehicle and which promotes safety in use.

Numerous expedients have been proposed for temporarily clamping or holding a throttle in an adjusted position so as to relieve the foot and leg strains of the operator on long driving runs. Generally speaking the prior art efforts to provide throttle controls have not been adopted commercially. One of the reasons for the failure of the prior art devices is that such devices were constructed and arranged so that there was a danger upon malfunctioning of the control that the throttle would be held in an open position and cause accidents.

Some of the prior art devices included electromagnets for releasing the holding position of the throttle and as a result of failure in the electric current supply or defects in the switches or electro-magnets the throttle would remain in its open position and thus endanger the operation of the vehicle.

Some of the prior art devices included pawl and ratchet and spring and cable mechanism constructed and arranged so that upon malfunctioning of such apparatus the throttle is held in open position with the attendant dangers of vehicle operation.

It is among the objects of our invention to provide a throttle control apparatus which is operatively connected to the intake manifold and which includes a vacuum-responsive compensator whereby a predetermined speed of the vehicle may be maintained.

It is a further object of our invention to provide a throttle control apparatus which is operatively connected to the intake manifold and which includes three different means for releasing the throttle control and restoring the throttle to normal foot actuation.

It is a further object of our invention to provide a throttle control according to the two preceding objects wherein clamping jaws are arranged to be moved by a vacuum-responsive actuator and wherein the clamping jaws may be released by a quick opening of the throttle by the depression of the foot brake or by the movement of a manually operated valve.

It is a further object of our invention to provide a throttle control wherein a throttle rod is arranged to move in the direction of its length to open and close a butterfly valve and wherein a vacuum-responsive compensator has one side thereof secured to the throttle rod and the other side thereof slidably mounted with respect to the throttle rod and wherein said other side is provided with a spring-mounted sleeve adapted to move generally parallel to the throttle rod and wherein a vacuum-responsive clamp is arranged to grip said sleeve whereby said compensator moves said throttle rod in response to changes in manifold vacuum when said sleeve is clamped.

It is a further object of our invention to provide a manually operable valve for a throttle control which valve may be moved in one position to connect a vacuum-responsive clamp to the manifold vacuum and to another position to admit atmosphere to said vacuum-responsive clamp to move the clamp to release position.

Further objects and advantages relating to safety in operation, ruggedness in construction and economies in manufacture will appear from the following description and the appended drawings wherein:

FIG. 1 is an elevation of a throttle control equipped with a compensating device made according to our invention;

FIG. 2 is an enlarged elevation with parts in section illustrating details of the construction of FIG. 1;

FIG. 3 is an elevation of a non-compensating throttle control made according to our invention;

FIG. 4 is a sectional view of the clamping assembly taken at the plane indicated at 4—4 of FIG. 3;

FIG. 5 is a sectional view of the clamping assembly taken as indicated at 5—5 of FIG. 4;

FIG. 6 is an enlarged elevation of the vacuum-responsive clamp mechanism employed in the throttle control;

FIG. 7 is a sectional view showing details of the manual valve in atmosphere position to release the clamp in the throttle control of our invention;

FIG. 8 is a sectional view of the manual valve showing the parts moved to a vacuum or clamped position;

Figure 9:
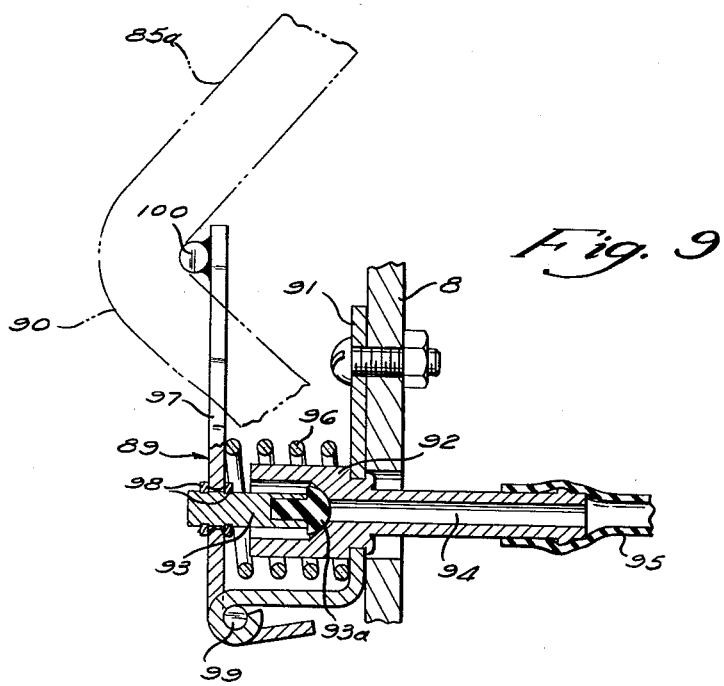
FIG. 9 is a sectional view of the brake-operated valve for admitting atmosphere to the throttle control clamp.

Referring to the drawings, a form of our throttle control is shown as mounted in a motor vehicle in FIG. 1 wherein the intake manifold of the engine for the motor vehicle is indicated at 6. The floor board in the driver's compartment is indicated at 7. The fire wall between the driver's compartment and the engine is indicated at 8 and the instrument panel for the vehicle is indicated at 9.

The motor vehicle is provided with the usual throttle foot pedal 10 and pivotally connected to the foot pedal 10 is an enlongated throttle rod 11 which is connected as at 12 at its forward end to the arm 13 of butterfly valve 14. The throttle rod 11 is normally biased by spring 15 to a position raising the foot pedal 10. The movement of the throttle rod 11 in response to movement of the foot pedal 10 is generally in the direction of its length, although it will be understood by reason of the pivotal connections at each end thereof that there may be parallel linkage movement or limited tilting of the throttle rod as it is moved from open to closed position.

A depending bar 17 is welded as at 18 or otherwise secured to the throttle rod 11. A bar 22 arranged generally parallel to bar 17 is mounted for sliding movement along the throttle rod 11 by reason of its being welded to a sleeve 19 as indicated at 20. A spring 21 normally biases the bar 22 away from the bar 17 which is fixed to the throttle rod 11.

The upper end of the bar 22 has welded, as at 23, a horizontally disposed secondary throttle rod 24. A sleeve 25 is mounted around the secondary throttle rod 24 for sliding movement thereon and is retained thereon by a transverse pin 26. A spring 27 normally biases the sleeve 25 against the transverse pin 26. A clamping mechanism indicated in its entirely as at 30 is arranged to selectively grip and hold the sleeve 25.

Figure 10:
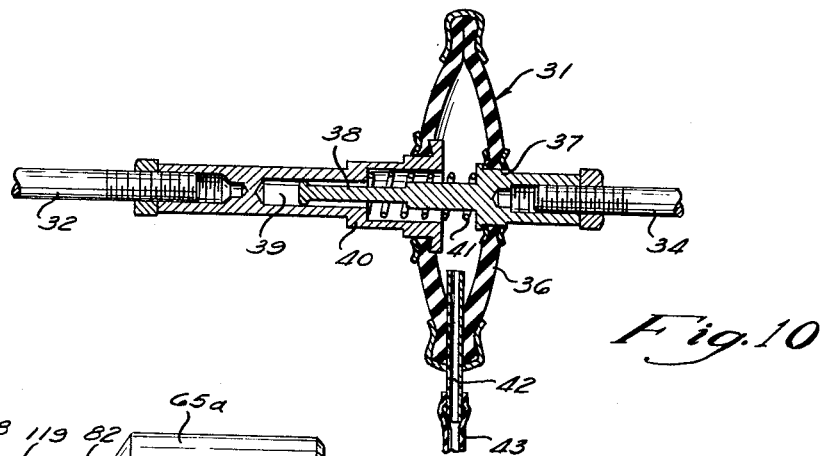
FIG. 10 is a sectional view showing details of the load compensator forming a part of the invention shown in FIG. 1.

The load compensating device, indicated in its entirety as at 31, includes a fitting 32 which extends through the bar 17 and is secured thereto by nuts 33. A similar fitting 34 extends through the bar 22 and is secured thereto by the nuts 35. The compensating device 31 includes the structure illustrated in FIG. 10 wherein a rubber bellows 36 has mounted in one wall thereof a member 37 having a reduced stem portion 38 guided within a bore 39 of a fitting 40 secured in the opposite wall of the bellows 36.

A spring 41 surrounds the stem 38 and normally biases the bellows 36 to an expanded or open position. A tubular inlet 42 is connected by way of hose 43 to the intake manifold 6.

Assuming the motor vehicle is in normal driving position and the clamping assembly 30 is released with respect to the sleeve 25, under this operating condition the motor vehicle may be going down-grade and a high manifold vacuum will occur in the manifold 6. This high vacuum will be effective to flatten the bellows 36 of the compensator 31 and the plate 22 will be moved toward the plate 17 and no throttle rod movement will result by reason of the operation of the load compensator 31.

Assuming, however, that the sleeve 25 is gripped and held fixed in space so as to prevent movement of the sleeve 25 and again assuming that the motor vehicle is going down-grade and the high vacuum conditions exists in the manifold 6, the walls of the bellows 36 will again be flattened. The spring 27 resists movement of the plate 22 to the left as viewed in FIGS. 1 and 2 and as a result the bar 17 is moved to the right by the flattening of the bellows 36 in the compensator. This moves the throttle rod 11 and the butterfly connected thereto toward a throttle-closing position. The amount of closing is related to the load decrease on the engine.

Conversely, we will assume that the sleeve 25 has been clamped to a predetermined position by the clamping mechanism 30 and the vehicle is going up-grade so as to cause a drop in manifold vacuum, the plate 22 will be restrained against movement to the right as views in FIGS. 1 and 2 and the expansion of the bellows 36 in response to its spring 41 moves the bar 17 to the left away from the bar 22. This movement is effective to move the throttle toward an open throttle position. The degree of opening is related to the load increase on the engine.

From the foregoing it will be understood that for turnpike driving the throttle control may be set at a speed of sixty miles per hour and that this speed will be maintained even though the vehicle encounter up-grades and down-grades such as will be effective to actuate the compensator 31. Preferably the compensation covers a range of about ten percent of the total throttle movement. This may be varied to suit the operator's requirements.

The clamping mechanism 30 includes the structure shown in detail in FIG. 4 wherein a bracket 45 is mounted on the engine or other fixed support surface 46 in the engine compartment. The bracket 45 is apertured as at 47 and a fixed clamping arm 48 having a jaw 49 is provided with a boss 50 which is journalled in the aperture 47 of the bracket 45 and is held in pivoted or journalled position by a cap screw 51. The pivotal mounting accommodates throttle rod motion other than reciprocation.

A movable clamping arm 52 is pivotally connected as at 53 to the fixed clamping arm 48. The movable clamping arm 52 includes a clamping jaw 54 and the jaws 49 and 54 are provided with semi-circular gripping recesses which embrace the sleeve 25 which is adapted to be clamped.

The clamping apparatus 30 includes a vacuum-responsive bellows 55 which is provided with a fitting 56 and arm 57 having upturned end 58 hooked into an aperture 59 in the moving clamping arm 52. The opposite wall of the bellows 55 is provided with a fitting 60 which has a hollow stem portion extending through an opening in the fixed clamping arm 48 and the bellows and fitting are mounted on the fixed clamping arm by means of horseshoe clip 61.

A vacuum line 62 extends from the clamping mechanism 30 to a T-fitting 63 and thence by conduit 64 to manual valve 65. Another vacuum line 66 runs from the manual valve 65 to the intake manifold 6.

The manual valve 65 mounted on the instrument panel 9 includes a valve body 67 having spaced aligned chambers 68 and 69 therein. The chambers 68 and 69 are connected to each other by a passageway 70.

A movable valve member, indicated in its entirety as at 71, includes a handle 72 and enlarged head portion 73 and a head portion 74. In the form of valve illustrated in FIGS. 7 and 8 the chamber 68 will be referred to as an atmosphere chamber and the chamber 69 aligned therewith will be referred to as the vacuum chamber. A fitting 75 connected to hose 64 communicates with a passageway 76 leading to the longitudinal passageway 70 within the valve body 67. The head portion 73 in the atmosphere chamber is provided with a gasket 73a and the head portion 74 in the vacuum chamber is provided with a gasket 74a. The head portion 74 is provided with diagonal passageways 77 so that when the gasket 74a is moved away from the end of the passageway 70, the vacuum chamber is placed in communication with the vacuum hose 64. With the valve parts in the position shown in FIG. 7, the gasket 74a closes the vacuum chamber 69 and atmosphere is introduced to the hose 64 by way of the atmosphere opening 73b in the chamber 68.

It will be observed that with the valve parts in the position of FIG. 7, atmosphere is admitted to the clamping mechanism 30 and the clamping jaws are released with respect to the sleeve 25. With the valve parts moved to the position shown in FIG. 8, the atmosphere chamber is closed with respect to the hose line 64 and the vacuum chamber 69 and accordingly manifold vacuum is effective within the bellows of the clamping mechanism 30 to cause the clamping jaws 49 and 54 to grip the sleeve 25.

The manual valve 65 includes a fitting 80 which is staked as at 81 to the valve body 67. A spring 82 is interposed between the end of the fitting 80 and the head 74 so that the spring 82 normally biases the valve to the position of FIG. 7. When the valve is moved to the position of FIG. 8, atmospheric pressure is effective across the area of the recess 73c, against the vacuum in the recess 73c to overcome the bias of the spring 82. This position of valve parts will be maintained as long as a predetermined manifold vacuum is maintained.

In the form of valve shown in FIGS. 7 and 8 the atmosphere chamber 68 provides a greater cross-sectional area than the vacuum chamber 69. It will be understood by those skilled in the art that this relationship may be reversed or that the areas may be the same, depending upon the bias of the spring 82 and other pressure variables.

The outlet fitting 80 includes a bore 83 and an adjoining bore of lesser cross-section indicated at 84. As will be understood as the description proceeds, the restriction provided by the reduced bore 84 will become important in effectively releasing the clamping mechanism 30 when the foot brake is applied.

The manual valve 65 not only selectively connects the clamping bellows to atmosphere or vacuum but provides for closure against flow of atmosphere into the intake manifold when the bellows is not connected to vacuum. The valve 65 is effective to hold its operational position against the spring bias except at very low manifold pressures.

The foot brake 85 includes a lever 85a which is pivotally mounted as at 86 on the fire wall and is normally biased to the position shown by the spring 87. A brake valve, indicated in its entirety as at 89, is mounted on the fire wall 8 adjacent the knee 90 of the brake pedal lever 85a. The valve 89 includes a mounting bracket 91, a fitting 92 secured thereto and a moving valve closure member 93 adapted to close the passageway 94 in the fitting 92.

A hose line 95 leads from the end of the fitting 92 to the T 63 inserted between vacuum lines 62–64. A coil spring 96 surrounds the fitting 92 and normally biases the lever 97 to the left as viewed in FIG. 9 so as to move the valve closure member 93 to open position. The valve closure member 93 includes a rubber head portion 93a fitting in the tapered seat in the fitting. The member 93 is coupled to the lever 97 by snap-rings indicated at 98.

The lever 97 is pivoted as at 99 on the mounting bracket 91 and is provided with a transverse pin 100 at its upper end. The pin 100 is fixed to and projects laterally from the lever 97 so as to bear against the inside of the knee 90 of the brake lever 85a. When the foot pedal 85 is depressed as in normal braking operation, the knee 90 will move to the left as shown in FIGS. 1 and 9, and thus the spring 96 will be effective to open the passageway 94 to atmosphere. Since the opening of the brake valve 89 to atmosphere conducts atmospheric pressure to the T 63, such pressure is effective in the clamping mechanism 30 by way of line 62 and to the valve 65 by way of line 64.

Since the restriction 84 is provided with the valve 65, the admission of atmosphere to the brake valve 89 will be effective to move the clamping mechanism 30 by way of line 62 rather than effect atmospheric pressure flow through the manual valve 65 to the line 66 and thence to the intake manifold 6. The addition of air to the mixture in the manifold should be avoided. It will also be understood that if a larger passageway were available for atmosphere through the valve 65, it would be difficult or impossible to bring about a quick release of the clamp 30 when the brake pedal is depressed.

In that form of the invention illustrated in FIG. 3, there is no provision for load compensation due to up-grade or down-grade conditions after the throttle is set in a predetermined position. Corresponding parts bear corresponding numerals in FIGS. 1 and 3. Accordingly the throttle pedal 10 is connected to the throttle rod 11 which, in turn, at its forward end is connected to the butterfly valve 14 by arm 13. A vacuum line 66 leads from the intake manifold 6 to the manual valve 65 and lines 64 and 62 connect the valve 65 to the vacuum clamping mechanism 30. In this form of the invention the sleeve 25 is mounted directly on the throttle rod 11.

The sleeve 25 is mounted between a washer 105 and a clamp 106 and a washer 107 and spring 108, washer 109 and clamp 110. Clamping jaws 49 and 54 are arranged to embrace the sleeve 25 and, assuming the sleeve 25 is gripped by the clamping jaws 49 and 54, the throttle may be depressed which will open the throttle and compress the spring 108. Upon release of the foot pressure on the pedal for the throttle 10, the throttle rod will move back in response to spring 15 and spring 108 until the washer 105 and clamp 106 are brought to abutment with the sleeve 25 as shown in FIG. 5. In this form of our invention the brake pedal 85 is arranged to operate the brake valve 89 as described in connection with the preferred embodiment of our invention.

Figure 11:
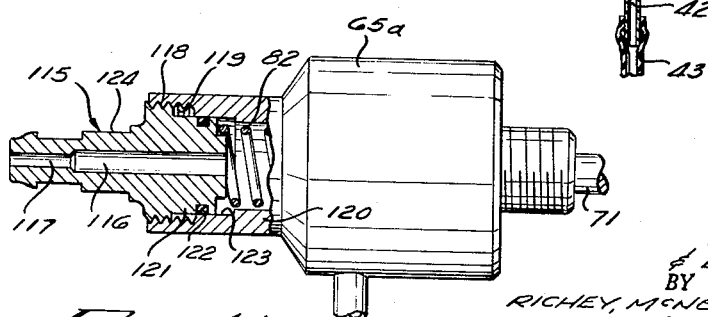
FIG. 11 is a modified form of manual valve wherein the responsiveness of the manual valve to vacuum may be varied.

In FIG. 11 we have illustrated a modified form of manual valve as at 65a. Preferably the valve 65a is constructed and arranged interiorly to correspond to the form of valve illustrated in FIGS. 7 and 8. The manually movable stem 71 is arranged to move closure members corresponding to 73 and 74 in the embodiment earlier described. In the form of valve shown in FIG. 11, however, the bias of the spring 82 may be adjusted by means of the fitting 115. The fitting 115 is provided with a bore 116 having the diameter reduction portion 117. The fitting 115 is exteriorly threaded as at 118 to be received within threads 119 on the valve body 120. The fitting 115 includes a cylindrical portion 121 having an O-ring 122 sealing the fitting in the cylindrical portion. The portion of the valve 115 projecting from the valve body as at 124 may have wrench flats or hex surfaces formed thereon to facilitate rotation of the fitting 115 within the body 120. It will be understood that rotation of the fitting 115 relative to the body will vary the compression on the spring 82 and thus vary the responsiveness of the valve to changes in manifold vacuum.

From the foregoing it will be understood that we have provided a throttle control apparatus wherein the throttle rod is gripped in a predetermined position by a vacuum-responsive clamping device. Three different methods are available to the user for releasing the throttle from its clamped position. For example, assuming the throttle rod is clamped to establish a half open throttle position. This is accomplished by depressing the throttle foot pedal 10 to half-open position and moving the manual valve on the dash to the position of FIG. 8. The vacuum will be effective in the clamp apparatus 30 to maintain half-open throttle position until either of three different release operations occur. In the first place, the operator may quickly depress the throttle foot pedal 10. This will cause a sharp drop in manifold vacuum and release the clamping mechanism 30 and move the manual valve 65 to the position of FIG. 7. A second mode of release operation is provided by depressing the brake 85 which will admit atmosphere through the valve 89 and thus release the clamping mechanism 30. A third mode of release operation is provided by the valve 65. The operator may manually move the valve from the position shown in FIG. 8 to that shown in FIG. 7 so that atmosphere is admitted to the clamping mechanism.

It will be observed that the spring 21 (FIG. 2) and the spring 41 (FIG. 10) are both acting in the same direction tending to bias the member 17 away from the member 22. Accordingly it will be understood that either the spring 21 or the spring 41 may be omitted without changing the mode of operation. In the event the spring 41 is omitted, the spring 21 will provide the force tending to expand the bellows 31.

Although we have described two forms of our invention and details of the component parts thereof in considerable detail, it will be understood by those skilled in the art that numerous modifications may be made therein without departing from the scope of the invention as defined in the following claims:

What is claimed is:

1. A throttle control for motor vehicles having an intake manifold, a throttle valve, a foot pedal and a throttle rod connecting the foot pedal and said throttle valve comprising a member operatively connected to said throttle rod and resiliently urged toward a predetermined position relative thereto, a clamping assembly mounted adjacent said member operable to clamp said member against movement, said clamping assembly including clamping means fixed against movement with said member operative to clamp said member against movement, a vacuum-responsive actuator operatively connected to operate said clamping means, a conduit line connecting said actuator and said intake manifold, first valve means in said line to connect said actuator to said intake manifold or to the atmosphere, a brake pedal, and second valve means operated by said brake pedal connecting said actuator to atmosphere when said brake pedal is operated.

2. A throttle control for motor vehicles having an intake manifold, a throttle valve, a foot pedal and a throttle rod connecting the foot pedal and said throttle valve comprising a member operatively connected to said throttle rod and resiliently urged toward a predetermined position relative thereto, a clamping assembly mounted adjacent said member operable to clamp said member against movement, said clamping assembly including a pair of clamping members pivoted to each other, a vacuum-responsive actuator operatively connected to said pivoted clamping members, a vacuum line connecting said actuator and said intake manifold, a valve in said line to connect said actuator to said intake manifold or to the atmosphere, and a vacuum-responsive actuator operatively connected to said throttle rod and said intake manifold to open the throttle as the manifold vacuum decreases.

3. A throttle control for motor vehicles having an engine and an intake manifold, a throttle valve, a foot pedal and a throttle rod assembly connecting the foot pedal and said throttle valve, a clamping assembly mounted adjacent said throttle rod assembly, said clamping assembly comprising a pair of clamping members pivoted to each other at one end thereof, one of said clamping members being fixed against movement with said rod assembly and the other being pivoted thereto, a vacuum-responsive actuator operatively connected to the end of said pivoted clamping members remote from the pivot, a vacuum line connecting said actuator and said intake manifold, a brake pedal, a first valve in said line operatively connected to said actuator and manifold to selectively connect said actuator to said intake manifold or to the atmosphere, and a second valve operated by said brake pedal to connect said actuator to atmosphere when said brake pedal is operated.

4. A throttle control for a motor vehicle having an internal combustion engine, an intake manifold for said engine, a throttle mounted in a passageway leading to said intake manifold, a foot pedal pivoted in the driver's compartment of the motor vehicle, a throttle rod connecting said foot pedal and said throttle, vacuum actuated clamping means mounted adjacent said throttle rod and fixed against movement therewith, a pair of abutments fixed to said throttle rod at each side of said clamping means, a sleeve member surrounding said throttle rod between said abutments, said sleeve having an axial extent less than the axial distance between said abutments and a spring interposed between said sleeve and the abutment remote from the throttle whereby said throttle rod may be moved axially in the sleeve toward the throttle while the sleeve is being gripped by said clamping means, a pair of clamping jaws carried by said clamping means arranged to grip said sleeve, conduit means interconnecting said manifold and said clamping means and a valve in said conduit to admit atmosphere to said clamping means to release said clamping jaws with respect to said sleeve, a foot brake, a second valve in said conduit and means operatively connected to said foot brake to open said second valve to admit atmosphere to said clamping means in response to brake actuation.

5. A throttle control for a motor vehicle having an internal combustion engine, an intake manifold for said engine, a throttle mounted in a passageway leading to said intake manifold, a foot pedal pivoted in the driver's compartment of the motor vehicle, a throttle rod connecting said foot pedal and said throttle, vacuum actuated clamping means mounted adjacent said throttle rod and fixed against movement therewith, a pair of abutments fixed to said throttle rod at each side of said clamping means, a sleeve member surrounding said throttle rod between said abutments, said sleeve having an axial extent less than the axial distance between said abutments and a spring interposed between said sleeve and the abutment remote from the throttle whereby said throttle rod may be moved axially in the sleeve while the sleeve is being gripped by said clamping means, said clamping means having a pair of clamping jaws to grip said sleeve, conduit means interconnecting said manifold and said clamping means and a valve in said conduit to admit atmosphere to said clamping means to release said clamping jaws with respect to said sleeve.

6. A throttle control for a motor vehicle having an internal combustion engine, an intake manifold for said engine, a throttle pivotally mounted in a passageway leading to said intake manifold, a foot pedal pivoted in the driver's compartment of the motor vehicle, a throttle rod pivotally connecting said foot pedal and said throttle, clamping means fixed against movement with said throttle rod and including a vacuum actuated bellows mounted near said throttle rod, a pair of axially spaced abutments on said throttle rod at each side of said clamping means, a sleeve member surrounding said throttle rod between said abutments operatively within said clamping means, said sleeve having an axial extent less than the axial distance between said abutments and a spring interposed between said sleeve and the abutment remote from the throttle whereby said throttle rod may be moved axially in the sleeve toward the throttle while the sleeve is being gripped by said clamping means, conduit means interconnecting said manifold and said bellows and a valve in said conduit to admit atmosphere to said clamping means to release said clamping means with respect to said sleeve, a foot brake, and valve means operatively connected to said foot brake to admit atmosphere to said clamping means in response to foot brake movement.

7. Throttle control means comprising a throttle rod, a foot pedal, a throttle, said throttle rod having a pair of spaced abutments secured thereto, a sleeve around said throttle rod between said abutments, said sleeve having an axial extent less than the distance between said abutments whereby one end of said sleeve is arranged against that abutment most nearly adjacent the throttle and a spring is interposed between the other end of said sleeve and said other abutment, clamping means engaging said sleeve, said clamping means having a pair of clamping arms pivoted to each other, one of said arms being supported in fixed position relative to said throttle rod, a vacuum-responsive actuator mounted between said clamping arms, said actuator being secured to one of said clamping arms and having a member operatively connected to the other of said clamping arms, said actuator being normally biased to an open position and moving said clamping arms away from each other upon the admission of atmosphere to said actuator, conduit means connecting said intake manifold and said actuator, brake means, release means operatively connected to said brake means to admit atmosphere to said actuator in response to brake means movement, a manual valve for admitting atmosphere to said actuator and for placing said actuator in communication with said intake manifold, said valve comprising a valve body having an axially movable stem, a vacuum chamber surrounding said stem, a vacuum valve closure secured to said stem in said vacuum chamber, and spring means biasing said vacuum valve closure to its closed position, an atmosphere chamber, an atmosphere closure member carried by said stem in said atmosphere chamber whereby movement of the stem in one direction opens a passageway between said clamp actuator and said manifold and said spring means in the vacuum chamber is compressed and atmospheric pressure is effective over the area of said atmosphere closure member to maintain said clamp actuator in communication with the intake manifold as long as said manifold vacuum is maintained at a predetermined value.

8. Throttle control means comprising throttle rod means, a foot pedal, a throttle, said throttle rod means having a pair of spaced abutments, a sleeve on said throttle rod means between said abutments, said sleeve having an axial extent less than the distance between said abutments whereby one end of said sleeve is arranged against that abutment most nearly adjacent the throttle and a spring is interposed between the other end of said sleeve and said other abutment, clamping means fixed against movement with said sleeve engaging said sleeve, said clamping means having a pair of clamping arms pivoted to each other, a vacuum-responsive actuator mounted between said clamping arms, said actuator being secured to one of said clamping arms and having a member operatively connected to the other of said clamping arms, said actuator being normally biased to an open position and moving said clamping arms away from each other upon the admission of atmosphere to said actuator, conduit means connecting said intake manifold and said actuator, a manual valve for admitting atmosphere to said actuator or placing said actuator in communication with said intake manifold, brake means, and a valve operated by said brake means for admitting atmosphere to said actuator.

9. A throttle rod control comprising clamping means having a first clamping arm mounted adjacent a throttle rod assembly and fixed against movement therewith, a second clamping arm pivotally connected to the first arm at one end of said arm, clamping jaws carried by said arms to embrace said throttle rod assembly, a vacuum actuator mounted on said first-named clamping arm between said first-named clamping arm and said second-named clamping arm, said actuator having opposed rubber walls moving toward their unstressed condition when the clamping arms move away from each other and conduit means connecting the interior of said actuator to an intake manifold, and means to open said conduit to atmosphere.

10. A throttle rod control comprising clamping means having a first clamping arm mounted adjacent a throttle rod assembly, a second clamping arm pivotally connected to the first arm at one end of said arm, clamping jaws carried by said arms adjacent the pivot to embrace said throttle rod assembly, a vacuum actuator mounted on said first-named clamping arm between said first-named clamping arm and said second-named clamping arm remote from said pivot, said actuator having opposed rubber walls moving toward their unstressed condition when the clamping arms move away from each other and conduit means connecting the interior of said actuator to an intake manifold, and means to open said conduit to atmosphere.

11. A throttle control for motor vehicles having an intake manifold, a throttle valve, a foot pedal and means connecting the foot pedal and throttle valve including a rod movable in the direction of its length toward and away from the throttle valve to open and close the throttle valve in response to foot pedal movement, a pair of axially spaced abutments on said rod, a sleeve on the rod between the abutments and a spring on the rod normally biasing the sleeve along the rod toward one abutment, manually controlled clamp means fixed against movement with said sleeve and adapted to grip the sleeve and limit the extent of valve closing movement of the rod, said clamp having vacuum-responsive means connected to said manifold to move the clamp to sleeve gripping position.

12. A throttle control for motor vehicles having a foot brake, a throttle valve, a foot pedal and means connecting the foot pedal and throttle valve including a rod movable in the direction of its length toward and away from the throttle valve to open and close the throttle valve in response to foot pedal movement, a pair of axially spaced abutments on said rod, a sleeve on the rod between the abutments and a spring on the rod normally biasing the sleeve along the rod toward one abutment, vacuum-responsive clamp means fixed against movement with said sleeve and adapted to grip the sleeve and limit the extent of valve closing movement of the rod and means moving in response to foot brake actuation to release said clamp.

13. A throttle control for motor vehicles having an intake manifold, a throttle valve, a foot pedal and means connecting the foot pedal and throttle valve including a rod movable toward the throttle valve to open the same and movable away from the throttle valve to close the same, said opening and closing movement of the rod being in response to foot pedal movement, axially spaced abutments on said rod, a member mounted on the rod for sliding movement having an axial extent less than the distance between the abutments and a spring on the rod between the member and an adjacent abutment normally biasing the sleeve toward the other abutment, vacuum-responsive clamp means to grip the member to limit the extent of closing movement of the rod, and a vacuum-responsive load compensator interposed between said rod and said throttle whereby said throttle is moved toward an open throttle position in response to a load on the engine when said member is clamped.

14. A throttle control for motor vehicles having an intake manifold, a foot brake, a throttle valve, a foot pedal and means connecting the foot pedal and throttle valve including a rod movable toward the throttle valve to open the same and movable away from the throttle valve to close the same, said rod being pivotally connected to and moved by said foot pedal, axially spaced abutments on said rod, a sleeve on the rod having an axial extent less than the distance between the abutments and a spring on the rod between the sleeve and an adjacent abutment normally biasing the sleeve toward the throttle rod, vacuum-responsive clamp means fixed against movement with said sleeve and adapted to grip the sleeve to limit the extent of closing movement of the rod, a manual control for said clamp, and a vacuum-responsive load compensator interposed between said rod and said throttle whereby said throttle is moved toward an open throttle position in response to a load imposed on the engine when said sleeve is clamped, and means connected to said foot brake to be moved thereby to release said clamp means.

15. A throttle control for motor vehicles having an intake manifold, a throttle valve, a foot pedal and means connecting the foot pedal and throttle valve including a reciprocating member, a vacuum actuated clamp mounted adjacent said member fixed against movement therewith, conduit means connecting said intake manifold and said clamp to restrain movement of said member in one direction in response to the application of manifold vacuum, a manually operated valve for said conduit, said valve having a vacuum chamber and an atmosphere chamber connected to each other by a passageway therebetween, a movable valve closure member having means thereon to close one end or the other of said connecting passageway, a spring arranged to bias said valve closure member in one direction so as to close the vacuum chamber with respect to said passageway between the chambers, a bore intersecting said passageway, said bore being connected to said vacuum actuated clamp whereby movement of said valve closure in one direction connects said clamp to said manifold and movement of the valve closure in an opposite direction connects said clamp to atmosphere.

16. A throttle control for motor vehicles having an intake manifold, a throttle valve, a foot pedal and means connecting the foot pedal and throttle valve including a rod, a vacuum actuated clamp mounted adjacent said rod fixed against movement therewith, a valve for said clamp, said valve having a vacuum chamber and an axially aligned atmosphere chamber connected to the vacuum chamber by a passageway therebetween, a manually operable movable valve closure member having means thereon to close one end or the other of said passageway, a spring arranged to bias said valve closure member in one direction so as to close the vacuum chamber with respect to said passageway between the chambers, a transverse bore intersecting said passageway, said transverse bore being connected to said vacuum-responsive clamp whereby movement of said valve closure in one direction connects said clamp to said manifold and movement of the valve closure in an opposite direction connects said clamp to atmosphere.

References Cited in the file of this patent

UNITED STATES PATENTS

| | | |
|---|---|---|
| 2,216,138 | Sellers | Oct. 1, 1940 |
| 2,712,762 | Pavlik et al. | July 12, 1955 |
| 2,742,123 | Exline | Apr. 17, 1956 |